US008892538B2

(12) United States Patent
Aaron (10) Patent No.: US 8,892,538 B2
(45) Date of Patent: Nov. 18, 2014

(54) SYSTEM AND METHOD FOR LOCATION BASED EVENT MANAGEMENT

(71) Applicant: Timothy Aaron, Los Angeles, CA (US)

(72) Inventor: Timothy Aaron, Los Angeles, CA (US)

( * ) Notice: Subject to any disclaimer, the term of this patent is extended or adjusted under 35 U.S.C. 154(b) by 189 days.

(21) Appl. No.: 13/676,092

(22) Filed: Nov. 13, 2012

(65) Prior Publication Data

US 2013/0172015 A1 Jul. 4, 2013

Related U.S. Application Data (60) Provisional application No. 61/558,026, filed on Nov. 10, 2011.

(51) Int. Cl.
*G06F 17/30* (2006.01)
*H04W 4/02* (2009.01)

(52) U.S. Cl.
CPC ....................................... *H04W 4/02* (2013.01)
USPC .......................................... 707/705; 705/319

(58) Field of Classification Search
None
See application file for complete search history.

(56) References Cited

U.S. PATENT DOCUMENTS

| 2009/0157693 | A1* | 6/2009 | Palahnuk ......................... 707/10 |
| 2010/0205541 | A1* | 8/2010 | Rapaport et al. ............... 715/753 |
| 2012/0072944 | A1* | 3/2012 | Felt et al. ......................... 725/25 |
| 2012/0254804 | A1* | 10/2012 | Sheha et al. .................. 715/834 |
| 2013/0006952 | A1* | 1/2013 | Wong et al. ................... 707/706 |

* cited by examiner

*Primary Examiner* — Wilson Lee
(74) *Attorney, Agent, or Firm* — Kafantaris Law Offices; Theo Kafantaris (57) ABSTRACT

A system and method for location based event management is disclosed for organizing content based on time, location, application, and relates this information to the user by linking an associated relevant content. This is accomplished by utilizing a time module, a people module, a location module, an applications module, a browser module, an event module, and a content module to filter and display associated content. Through these modules, an event list is updated with results based on time, location, and relevance to the user and location, thus prioritizing information in a unique and novel manner.

19 Claims, 5 Drawing Sheets

FIG. 5

SYSTEM AND METHOD FOR LOCATION BASED EVENT MANAGEMENT

CROSS-REFERENCE TO RELATED APPLICATIONS

This application claims the benefit of U.S. Provisional Patent Application No. 61/558,026, filed on Nov. 10, 2011, U.S. Provisional Patent Application No. 61/591,527, filed Jan. 27, 2012, and U.S. Provisional Patent Application No. 61/611,812, filed on Mar. 16, 2012, and incorporated herein by reference.

STATEMENT REGARDING FEDERALLY SPONSORED RESEARCH AND DEVELOPMENT

Not Applicable.

FIELD OF THE INVENTION

This invention relates generally to a system and method for location based event management, and more particularly, to a system for organizing and linking events based on location, time, participants, and other related content.

DISCUSSION OF RELATED ART

A mobile device can generally be described as an apparatus capable of accessing and computing data remotely using a wireless connection. Mobile device features include accessing email, sending and receiving messages, downloading and executing mobile applications, GPS navigation, camera, video, and other means of manipulating data remotely. Current leaders in mobile device software include Apple IOS, Google Android, and Microsoft Windows Phone 7.

A social network can generally be described as a public forum where users volunteer personal information to the public, and where users can connect with each other based on social associations. Typically, social networks provide a means of uploading and sharing photos, profiles, events, birthdays, groups, status updates, and other social and personal information. Current leaders in social networking include Facebook, MySpace, Foursquare, LinkedIn, and many others, and mobile devices are providing additional remote access to such services.

A search engine is an application designed to provide content based information through the internet. The search engine provides an interface where the user inputs data usually in the form of a word or sentence. The search engine then outputs the results as list of results often referred to as "search engine results pages," also known as SERP's. The SERP's are ranked based on their relevance to the search terms used. Current leading search engines include Google, Yahoo, and Bing.

While there are very powerful tools for obtaining content based information, these tools lack the cohesion that would optimize the use of the information. The user can acquire information but must bear the burden of searching for the correct data and sorting through the data to get the best results. Hence, this process often limits the user from maximizing his/her particular social experience. Therefore, a need exists for a system that organizes content based on time, location, application, and relates this information to the user by linking an associated relevant content.

SUMMARY OF THE INVENTION

The present invention is a system that organizes content based on time, location, application, and relates this information to the user by linking an associated relevant content. This is accomplished by utilizing a time module, a people module, a location module, an applications module, a browser module, an event module, and a content module to filter and display associated content.

The invention was originally conceived with a musical event as the primary type of content, with the intended result being a geographical radio station summarizing events in the vicinity of a location. The present invention fills the need for computer software that seeks to gather and provide information, and utilizes such to provide, in the form of data categorized by geographical location, distance and events in a given area, for that user.

In other words, software that cross references a geographic location, defined automatically or by choice, with current events and creates a listing that represents a sample of those events.

Returning to the example where a live music venue is the desired content, the software functions as a snapshot in time as a taste of those live events. The music itself might be sourced from a previous recording to provide fidelity, but, to the best of its ability, the software would be trying to provide the same songs that are being performed by this act, either through anticipation based on a latest release or mostly from previous performances from the current tour. Users may manipulate or add data that circumvents this premise, but this core principal guides the goal of the software, to get an idea of what to expect if one attended, or to get an idea of what's happening with current music in a region. With automatic location detection combined with the present time, one could just launch the software and start listening. In the same fashion, one can replace a musical venue with any other time and location sensitive content.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 2:
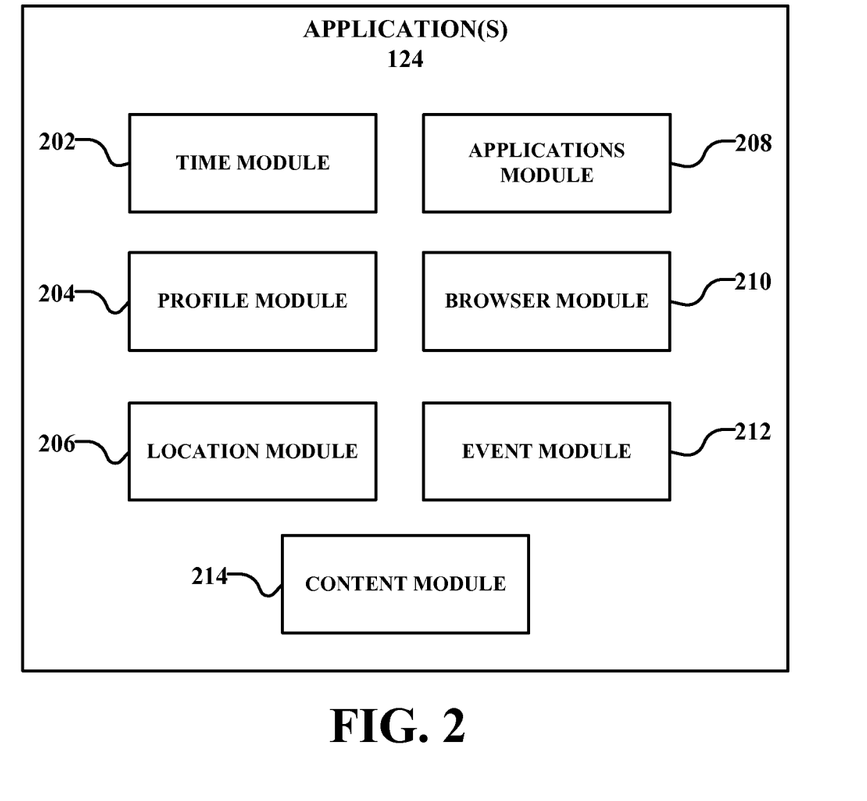
FIG. 2 is a diagram schematically illustrating the modules of the present invention.
Figure 3:
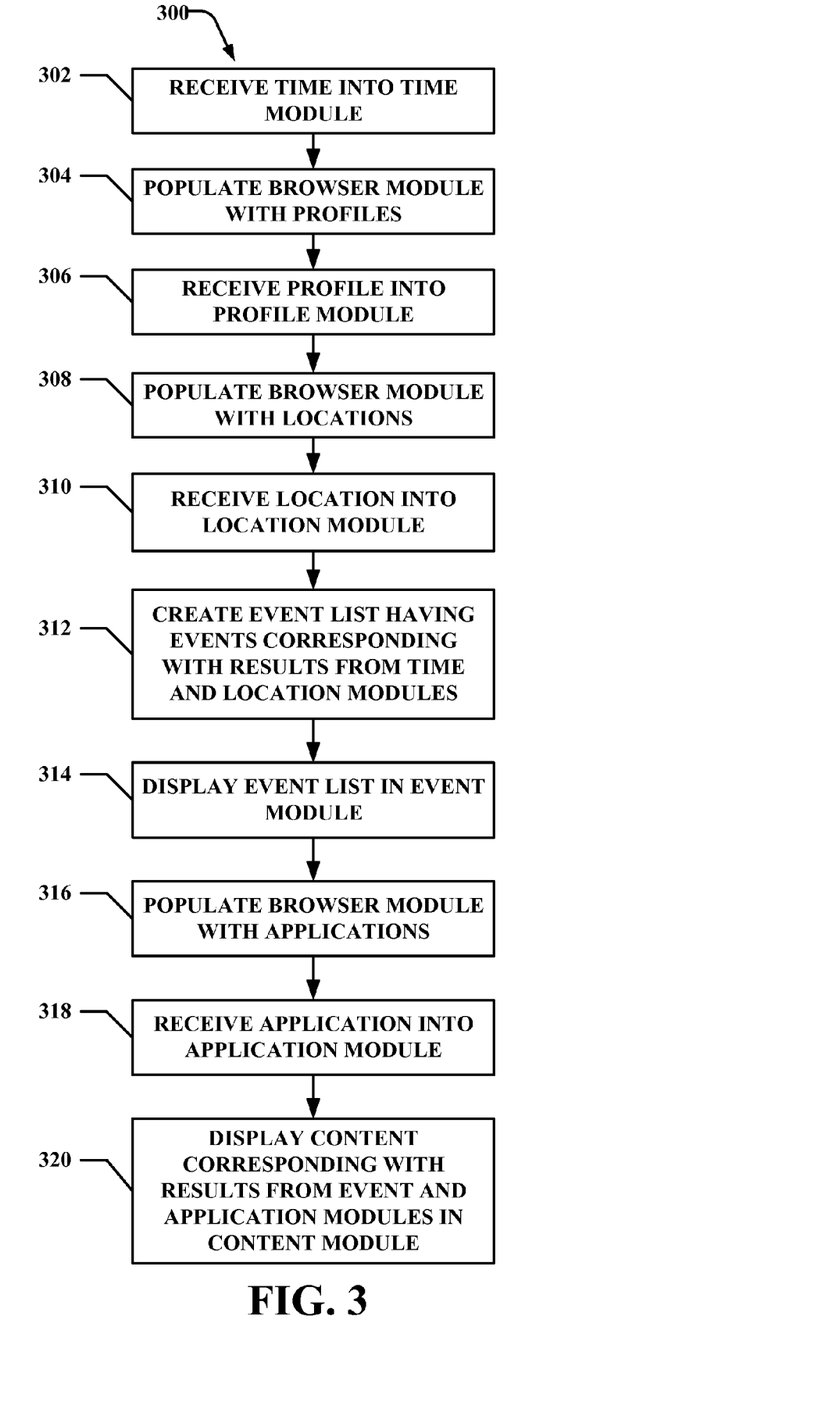
FIG. 3 is a flowchart illustrating the candidate environment of the present invention.
Figure 4:
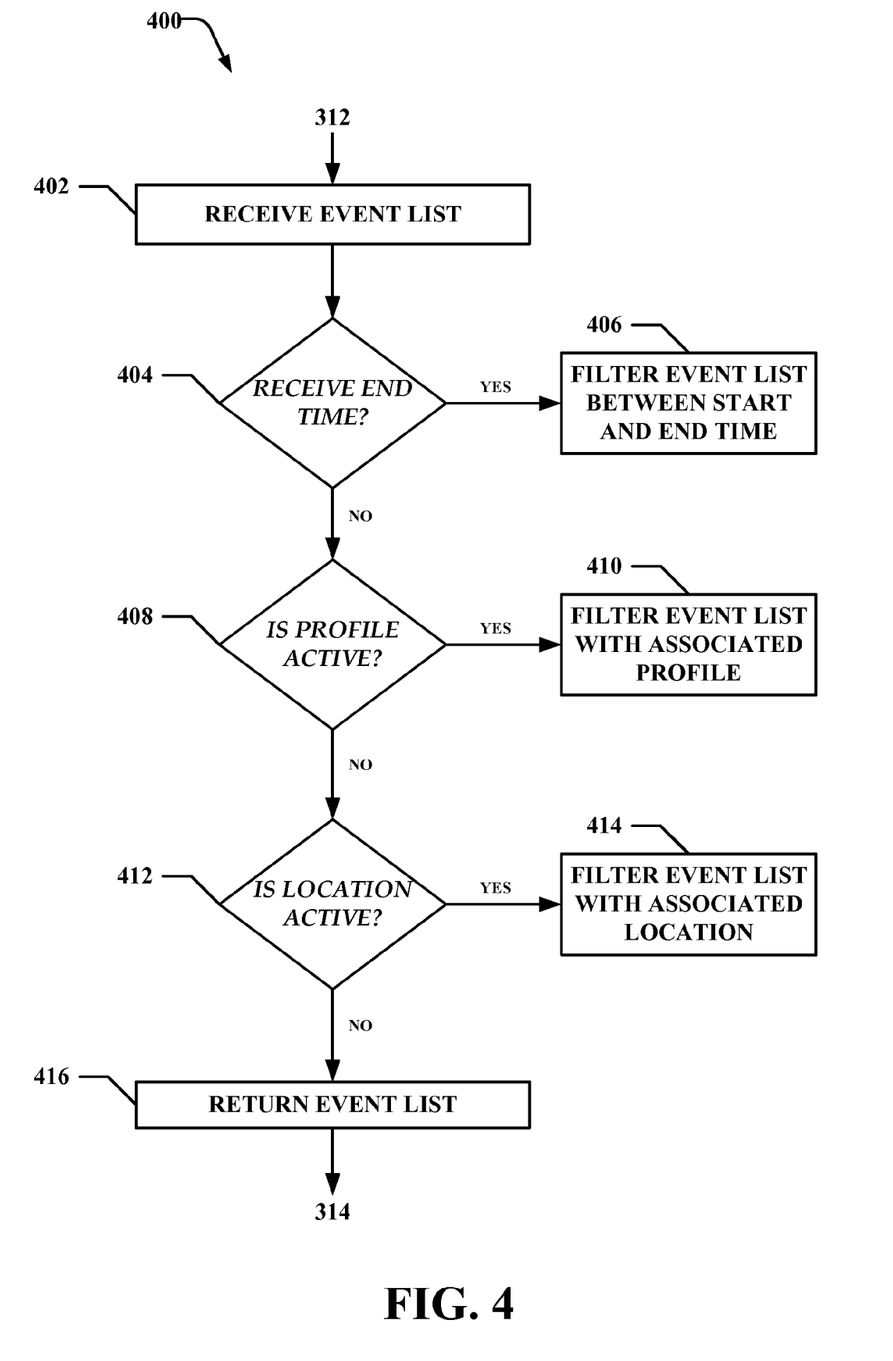
FIG. 4 is a flowchart illustrating the recruiter environment of the present invention.
Figure 5:
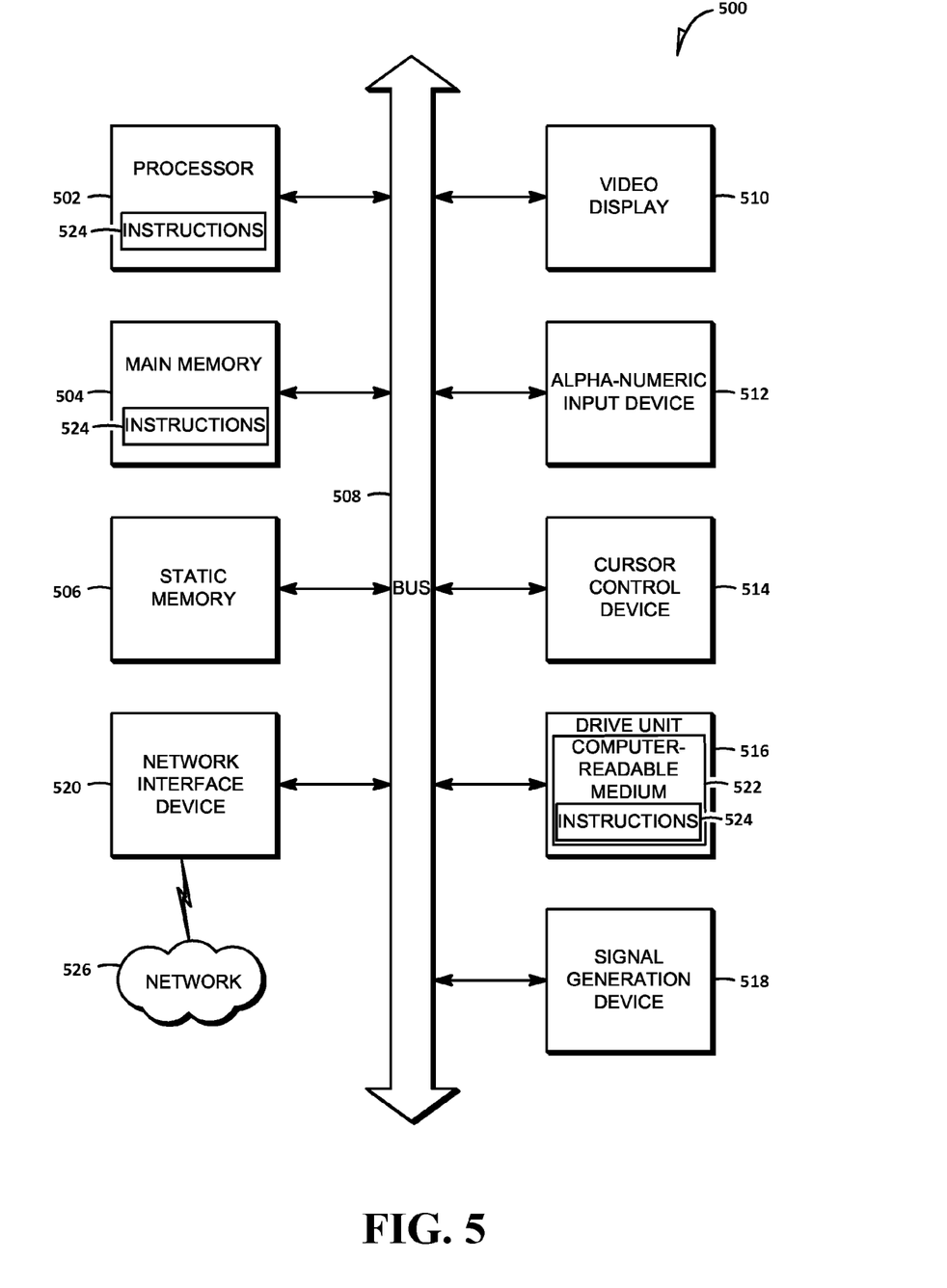
FIG. 5 is a diagram schematically illustrating a computer system utilized by present invention.

A system and method for location based event management is disclosed for organizing content based on time, location, application, and relates this information to the user by linking an associated relevant content. This involves updating an event list with results based on time, location, and relevance to the user and location, thus prioritizing information in a unique and novel manner. This is accomplished by utilizing a time module 202, a people module 204, a location module 206, an applications module 208, a browser module 210, an event module 212, and a content module 214 to filter and display associated content 216.

Figure 1:
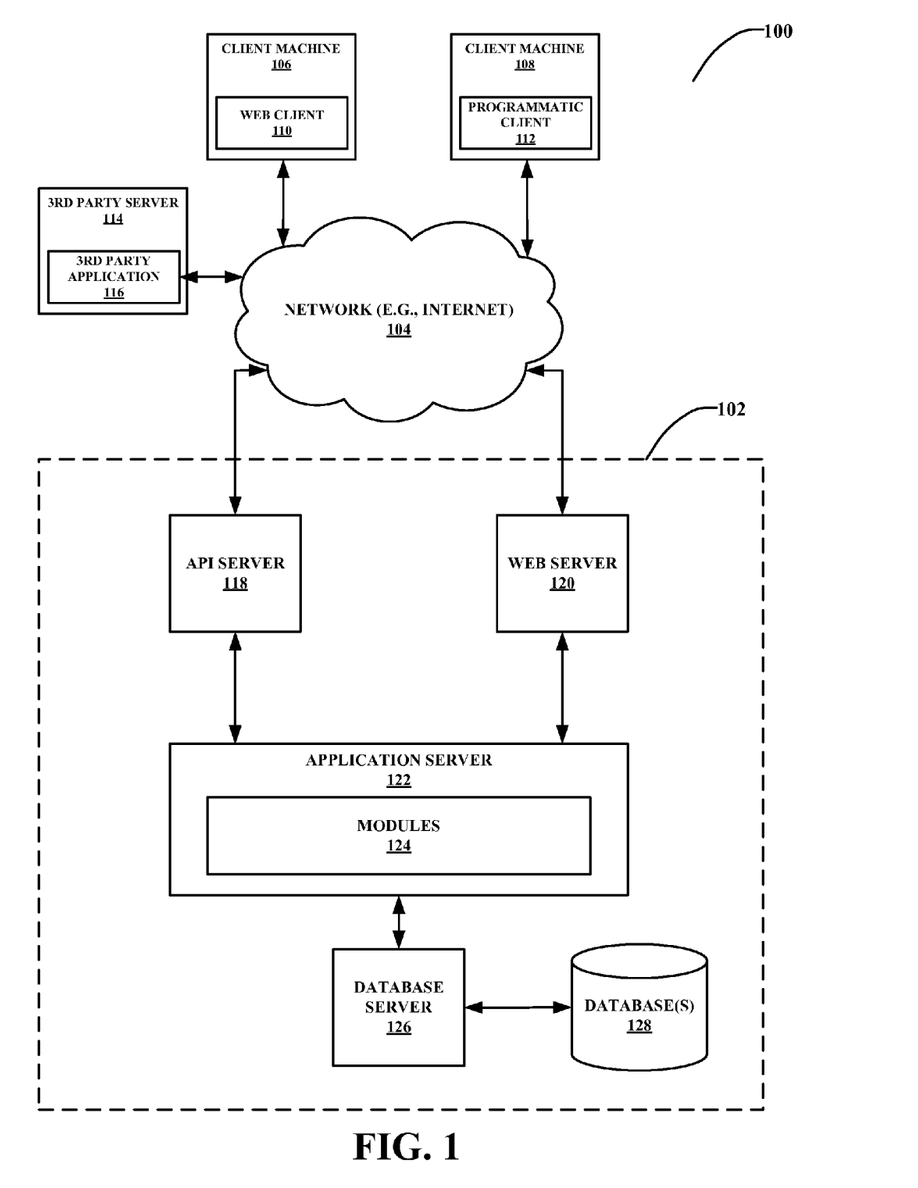
FIG. 1 is a diagram schematically illustrating a network wherein the server and client machines are connected.

FIG. 1 depicts a block diagram of a computer system 100 suitable for implementing aspects of the present invention. As shown in FIG. 1, computer system 100 includes the present invention 102, which interconnects major subsystems such as an API server 118, web server 120, application server 122, and database server 126 having a storage means 522. The application server 122 consists of several modules 124, and a database 128 exists on the database server 126. The present invention 102 connects to client machines 106 and 108, as well as 3rd party servers 114, through a network 104. Web clients 110 and programmatic clients 112 exist on the client machines 106 and 108, respectively, and 3rd party applications 116 that exist on the third party server 114.

The present invention will display the above modules on a mobile device 106 or workstation 108. When loading data, the client 106 will be in networked communication with any of the servers 122, 126. The client 106 will first enter a first time and second time received by the time module 202. If only a first time is received, the second time will be considered as an arbitrary point in the future and no time range is selected. The user will select next a profile to load, either through the people module 204 or location module 206. When the people module 204 is selected, the browser module 210 will display a plurality of people profiles, each people profile comprising a list of dated events related to an avatar. When the location module 206 is selected, the browser module 210 will display a plurality of location profiles, each location profile comprising a list of dated events related to a location.

Once a profile is selected, the event module 212 will display an event list corresponding with the events within the selected profile. The events in the event list are selectable, providing additional content to be displayed through a content module 214, which is configured to display the event and application content. The applications module 208 further limits the content module 214 to display specific content relating to each application and event selected. The event list is configured to display events within a time range, or if no second time is received, then from a first time to infinity.

A unique feature of the present invention permits profiles to be activated and deactivated, thus manipulating the results given in the event list. In other words, the people profile, location, and application profiles can be activated for populating the event list or deactivated for withdrawal from the event list. Furthermore, the application profile can be activated for displaying application content and deactivated for withdrawal of the application content. Finally, the second time can be activated to for displaying events dated between said first and second time and deactivated for displaying all events dated after said first time.

Activating and deactivating profiles is done through the people module, location module, application module, and browser module. The selectable results of the browser module will display people profiles when the people module is selected, display location profiles when the location module is selected, and display application profiles when the application module is selected. These selectable results are then capable of being selected for participation in the event list.

The events in the event list are sorted first by distance and second by popularity. After activating and deactivating profiles, a unique event list is created, which can then be stored on the storage means as a new profile selectable in the people or location module. The browser module is further configured to display results relating to a selected event, wherein selectable results are populated with associated people, location, and application profiles of the selected event. The selectable results are capable of being selected for participation in the event list.

The location module further comprises determining a client location having an adjustable radius defining a scope. The event module will only display events positioned within the scope. Each people profile will further comprise a people profile location, where the browser module will display people profiles positioned within their scope. Furthermore, the client location is capable of being repositioned automatically or manually, with the results updating accordingly. A GPS device, typically on a mobile device, can provide the location of the client for automatic updating.

The content module comprises a plurality of multimedia elements. These elements include: a location-based map display, a photo display, a text display, a video display, a playlist display, a recording display, and a photo tagging display. The content module may further comprise interactive content sending and receiving information between application profiles. In an alternative embodiment, a playback module is configured to receive an event list and sequentially display the application content of an event list.

An example using mentioning each of the features above in order, including a plug-in that completes the one of the initial primary experiences the software attempts to provide. A user launches the software. The first time the software requests permission to use a location from the user. "Avatar 1" is loaded from the browser module 210 into the people module 204 and has a default location of 'user'. Sound starts playing related to an event occurring at the present moment, from the closest location to the user, along with recent images and words.

A map from the content module indicates a default location of the Avatar (in this case the center of the current map) the location nearby, in this case by an image of an ear, as well as other places in the event listing. The event listing indicates levels of specific information regarding the event(s) and which event is being experienced at the moment by the user. The user will scroll through and delete a few distant venues he doesn't care for, with an ear moving around on the map representing the location of the event he's listening to.

A group of people attending the event, including artists, change to reflect the event he's previewing. The user considers which one of these individual people to load into the people module and notices a friend at an event, whom he loads into the people module He notices he can expand the current date range of the current play-listing, to include the present moment to a week in the future. The play-listing becomes chronological. He can view the event time of the next event he is currently previewing which begins in one hour. It is his friends intended future, because although the event hasn't occurred but his friend has indicated his attendance and it is reflected in the interface.

The music application is selected and defaults to music and the bands most recent record release, which is most time relevant. Pictures are displaying in the people module where they are the most recent photos outside of the music club the band will be playing at. The plug-in limits event-listings to include only 2 events per list. The place changes to the next destination and so does the event.

Next, the user has decided to leave the people profile as the source of written material, with the option of selecting the people or location modules. The user is reading written reviews of the event while listening in the content module. The written material displays a more specific source. The ser really likes the event so far but doesn't have time to attend. He assigns or saves the current settings to Avatar 1, so he can return and possibly purchase merchandise from venders associated with the event. The user also saves or assigns that assignment to his friend by sending them a request to publish it to their profile or create one for them. The user notices some users have many followers of their listings.

The user loads Avatar 1 into the people module. New images from the event he missed are now present from people uploading them. He notices his friend in the picture, hits a button to lock the screen at this moment, and tags his friend in time. The software might then again send a request to publish it to his friends profile or create one for him or ask the user if they want this published. His friend (Joe) has accepted this request and other people have started following Joe, and listening to the listing seer created for Joe's evening out. These other people are adding Joe, not necessarily all of his activities but maybe just this portion of his listing, defined by a timeframe, to an Avatar, to which they will add other peoples listings derived from specific timeframes.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for time based event management comprising:
   a server having a storage means;
   a client configured for networked communication with said server;
   a time module configured to receive a selectable first time and a selectable second time;
   a people module configured to receive a people profile, said people profile comprising a list of dated events related to an avatar;
   a location module configured to receive a location profile, said location profile comprising a list of dated events related to a location;
   an applications module configured to receive an application profile, said application profile comprising application content related to events;
   a browser module configured to display a plurality of selectable people profiles, location profiles, and application profiles;
   an event module configured to display an event list, said event list comprising a plurality of selectable dated events populated from selected people, location, and application profiles, said event list displaying events dated between said first and second time; and
   a content module configured to display said application content associated with said application profile and selected dated event from said event list;
   wherein said people profile, location, and application profiles can be activated for populating said event list or deactivated for withdrawal from said event list, said application profile can be activated for displaying application content and deactivated for withdrawal of said application content, said second time can be activated to for displaying events dated between said first and second time and deactivated for displaying all events dated after said first time, and wherein said event list can be stored on said storage means as a new profile selectable in said people or location module.

2. The time based event management system of claim 1, wherein said selectable results of said browser module further comprises displaying people profiles when said people module is selected, displaying location profiles when said location module is selected, and displaying application profiles when said application module is selected, said selectable results capable of being selected for participation in said event list, said selectable results sorted first by distance and second by popularity.

3. The time based event management system of claim 1, wherein said location module further comprises determining a client location having an adjustable radius defining a scope, said event module only displaying events positioned within said scope, said client location capable of being repositioned automatically or manually.

4. The time based event management system of claim 3, wherein said people profiles further comprise a people profile location, and wherein said browser module will display people profiles positioned within said scope.

5. The time based event management system of claim 1, wherein said content module further comprises;
   a plurality of multimedia elements selected from a group comprising: a location-based map display, a photo display, a text display, a video display, a playlist display, a recording display, and a photo tagging display;

said associated content further comprising interactive content for sending and receiving information between application profiles.

6. The time based event management system of claim 5, further comprising:
a playback module configured to receive an event list and sequentially displaying said application content of said events of said event list.

7. The time based event management system of claim 2, wherein said browser module is further configured to display results relating to a selected event, wherein selectable results are populated with associated people, location, and application profiles of said selected event, said selectable results capable of being selected for participation in said event list.

8. A processor-implemented method for time based event management, the method comprising:
receiving a first and second time;
displaying a plurality of selectable people profiles, location profiles, and application profiles in a browser module;
receiving a people profile comprising a list of dated events related to an avatar into a people module;
receiving a location profile comprising a list of dated events related to a location into a location module;
receiving an application profile comprising related application content into an application module;
displaying an event list comprising a plurality of selectable dated events populated from said people, location, and application profiles between said first and second time in an event module;
receiving an event selection from said event list;
displaying application content associated with said application profile and event selection in a content module;
wherein said people profile, location, and application profiles can be activated for populating said event list or deactivated for withdrawal from said event list, said application profile can be activated for displaying application content and deactivated for withdrawal of said application content, said second time can be activated to for displaying events dated between said first and second time and deactivated for displaying all events dated after said first time, and wherein said event list can be stored on said storage means as a new profile selectable in said people or location profiles.

9. The method of claim 8, further comprising displaying selectable people profiles when said people module is selected, displaying selectable location profiles when said location module is selected, and displaying selectable application profiles when said application module is selected, said selectable results capable of being selected for participation in said event list, said selectable results sorted first by distance and second by popularity.

10. The method of claim 8, further comprising:
receiving a client location having an adjustable radius defining a scope, said client location capable of being repositioned automatically or manually;
displaying an event list with events positioned within said scope;
displaying a plurality of selectable people profiles positioned within said scope.

11. The method of claim 8, further comprising displaying associated application content selected from a group comprising: a plurality of multimedia elements selected from a group comprising: a location-based map display, a photo display, a text display, a video display, a playlist display, a recording display, and a photo tagging display; said associated content further comprising interactive content for sending and receiving information between application profiles.

12. The method of claim 11, further comprising receiving an event list and sequentially displaying said application content of said events of said event list.

13. The method of claim 8, further comprising displaying results relating to a selected event, wherein selectable results are populated with associated people, location, and application profiles of said selected event, said selectable results capable of being selected for participation in said event list.

14. A non-transitory computer-readable storage medium storing a set of instructions that, when executed by a processor, cause the processor to perform operations, comprising:
receiving a first and second time;
displaying a plurality of selectable people profiles, location profiles, and application profiles;
receiving a people profile comprising a list of dated events related to an avatar;
receiving a location profile comprising a list of dated events related to a location;
receiving an application profile comprising related application content;
displaying an event list comprising a plurality of selectable dated events populated from said people, location, and application profiles between said first and second time;
receiving an event selection from said event list;
displaying application content associated with said application profile and event selection;
wherein said people profile, location, and application profiles can be activated for populating said event list or deactivated for withdrawal from said event list, said application profile can be activated for displaying application content and deactivated for withdrawal of said application content, said second time can be activated to for displaying events dated between said first and second time and deactivated for displaying all events dated after said first time, and wherein said event list can be stored on said storage means as a new profile selectable in said people or location profiles.

15. The non-transitory computer-readable storage medium of claim 14, further comprising displaying selectable people profiles when said people module is selected, displaying selectable location profiles when said location module is selected, and displaying selectable application profiles when said application module is selected, said selectable results capable of being selected for participation in said event list, said selectable results sorted first by distance and second by popularity.

16. The non-transitory computer-readable storage medium of claim 14, further comprising:
receiving a client location having an adjustable radius defining a scope, said client location capable of being repositioned automatically or manually;
displaying an event list with events positioned within said scope;
displaying a plurality of selectable people profiles positioned within said scope.

17. The non-transitory computer-readable storage medium of claim 14, further comprising displaying associated application content selected from a group comprising: a location-based map display, a photo display, a text display, a video display, a playlist display, a recording display, and a photo tagging display; said associated content further comprising interactive content for sending and receiving information between application profiles.

18. The non-transitory computer-readable storage medium of claim 17, further comprising receiving an event list and sequentially displaying said application content of said events of said event list.

19. The non-transitory computer-readable storage medium of claim 14, further comprising displaying results relating to a selected event, wherein selectable results are populated with associated people, location, and application profiles of said selected event, said selectable results capable of being selected for participation in said event list.

* * * * *